April 30, 1929.  C. F. JENKINS  1,711,318
GROUND SPEED METER
Filed Nov. 5, 1927
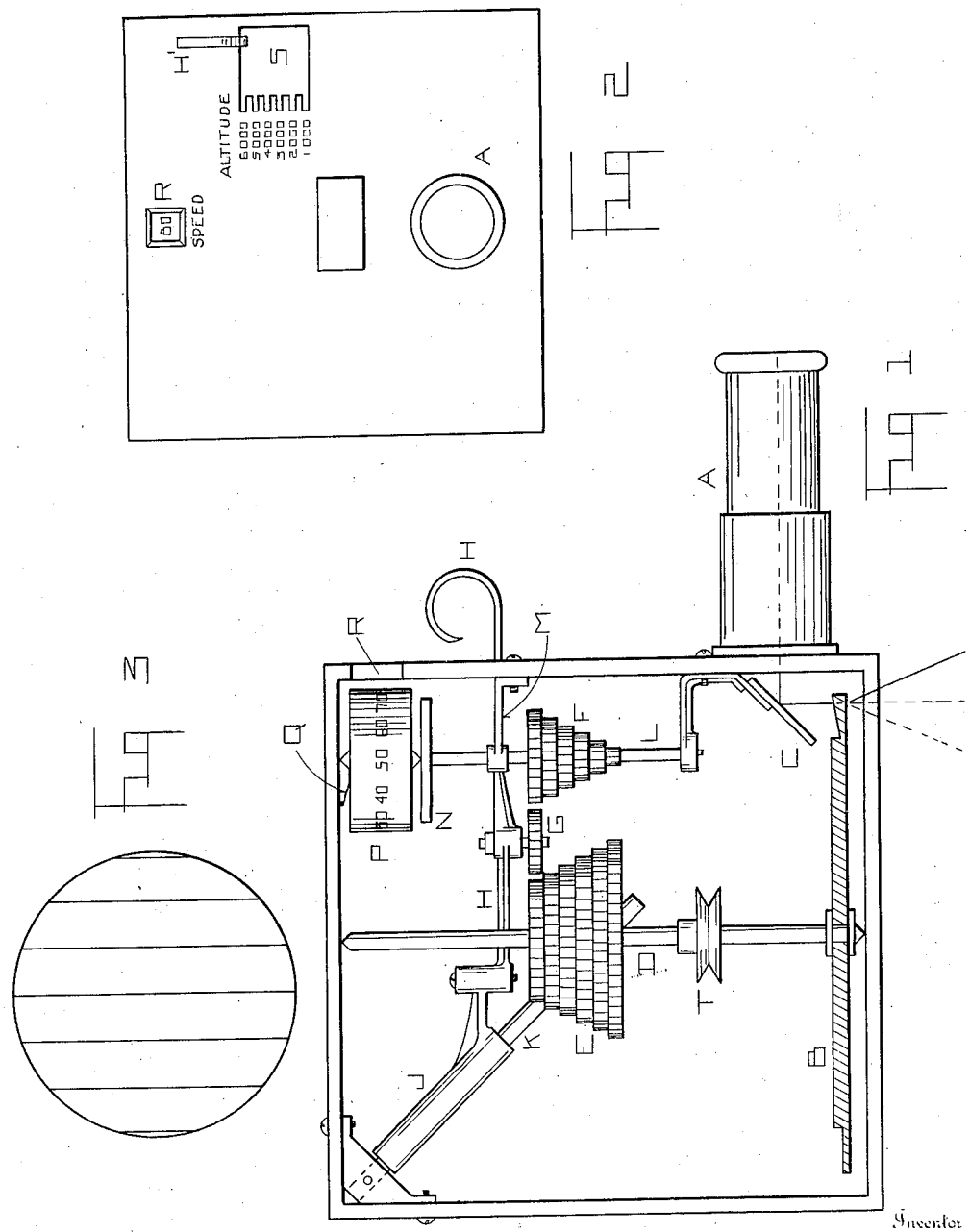

Patented Apr. 30, 1929.

1,711,318

UNITED STATES PATENT OFFICE.

CHARLES FRANCIS JENKINS, OF WASHINGTON, DISTRICT OF COLUMBIA.

GROUND-SPEED METER.

Application filed November 5, 1927. Serial No. 231,275.

This invention relates to that class of instrument known as "ground speed meters", and has for its object an instrument which will give a direct reading of the speed of the airship toward its goal irrespective of the direction or velocity of the wind.

The principle involved is the repeated measurement of an intangible base line in the air of a triangle of constant apex angle on the ground.

This is accomplished by visual indication to the observer that the ship is repeatedly subtending an angle equal to a known horizontal distance.

For, with the altitude and the angle known, the base is readily determined, and, therefore, a given number of repetitions of these base lengths per minute can mechanically be translated into readings in miles per hour.

Adjustment for different altitudes of flight is equally simple, for if the altitude is half as great the base line is half as long, and, therefore, the frequency is a function of the flight speed.

The visual phenomenon which is a basis of this instrument depends on the fact that when a stationary object is viewed along a hinged beam of light, the object seems to be in motion; and conversely when the object is in motion, it may be made to appear stationary.

In the instrument the subject hereof, readjustments are made, one for drift, one for altitudes, and one for speed, whereupon the speed can be read directly from the speedometer dial. The adjustments for altitude and speed are the only ones involved in this application.

The instrument is illustrated in the drawings herewith; Figure 1 being an inside elevation; Figure 2 a front view of the instrument; and Figure 3 an element of optical instrument A. In the drawings A is a telescopic eye-piece through which objects below are observed through prismatic ring B (Patent No. 1,385,325), and by reflection in mirror C. The prismatic ring is mounted on shaft D, which carries a plurality of gears E which engage with a like plurality of gears F through mutual engagement of gear G, which latter can be put into and out of engagement by the hinged arm H and H', upon which G is mounted. Arm H is pivoted on a member J which slides on the square shaft K. The plurality of gears E and similar plurality of gears F are of stepped diameter relation, and F is in reverse order to E. F is mounted on a shaft L, the upper end of which passes through bearing M and has on its end a magnet N. This magnet N, when put in rotation, induces currents in the cylinder P to produce angular displacement against the hair spring Q in proportion to the speed of rotation of N, in a well known manner. The H' end of shaft H extends beyond the face of the box (enclosing all of this mechanism), coming out through the opening S which has a notched edge, into each of which notches shaft H' can be lodged to hold gear G into mutual contact with the gears E and F at different levels to obtain different speeds of rotation of the shaft L. The notches are marked to indicate corresponding altitudes of flight. Shaft D has a pulley T thereon for driving it from any suitable source of power, as by a round belt connecting grooved pulley T to said power source.

The instrument is mounted on the airship in any convenient horizontally rotatable position, and its operation in flight is as follows—

The observer viewing an object on the "ground" surface below through the eyepiece A sees the object sweeping across the lines of Figure 3 in his field of vision and turns the instrument about until the object sighted appears to move along these lines. This sets the meter so that it will measure the ground speed of the airship without any need for making wind-drift allowances.

The next adjustment is for altitude which the observer takes directly off the altimeter, setting the lever H' into the notch corresponding to that altitude.

With the shaft D turning at a correct and constant speed this shift of the arm H—H' causes acceleration of the shaft L so that a correct speed reading (for that elevation) appears on the drum P through the window R.

The meter reading referred to results from the view of the object below along a constantly changing angle of sight which looking through the revolving prismatic ring causes, for the radial angle of the ring is constantly changing with an equal increment of prism angle for equal angles of arc.

Each rotation of the ring, therefore, represents equal angles on the ground as the ship moves along, and an equal length of base line of flight at a constant altitude.

Consequently a known repetition of these base-lines per minute can be mechanically translated into miles per hour, just as the repeated rotation of an automobile wheel is so translated.

As the prismatic ring is a single, solid piece of glass which constantly changes the prism angle of its sides from end to end as it rotates, repeated with each revolution, an accuracy of measurement results which cannot be secured by a vibrating mirror which bounces by the shock of returning to its initial angular setting with the repetition of each base line measurement. When prismatic rings are used the accuracy of measurement is not endangered by an increase in speed.

Obviously, in claiming a speed meter for airships, I do not wish to limit myself to the application of this instrument to vehicles of the air, as the instrument can, of course, be used to measure speeds of surface vehicles, or objects.

What I claim, is—

1. In a direct-reading ground-speed meter for airships, a rotating prismatic ring, means for viewing an object through said rotating prismatic ring; and means operably connected to said prismatic ring for translating the repeated rotation of said ring into time-distance constants.

2. In a direct-reading ground-speed meter for airships, a rotating prismatic ring, means for viewing an object through said rotating prismatic ring, means connected to said prismatic ring for translating the repeated rotation of said ring into time-distance constants; and means in operable relation with said translating means for compensating for elevation of said airship.

In testimony whereof I have affixed my signature.

CHARLES FRANCIS JENKINS.